2,865,711

PROCESS FOR THE PRODUCTION OF HYDROGEN FLUORIDE

Gunter H. Gloss, Mundelein, Ill., and David H. Reeve, Lakeland, Fla., assignors to International Minerals & Chemical Corporation, a corporation of New York No Drawing. Application November 29, 1956
Serial No. 624,990

11 Claims. (Cl. 23—153)

This invention relates to the preparation of hydrogen fluoride from a fluorine-containing ammonium composition. More particularly, it relates to a method in which fluorides present in den gases produced in the reaction of phosphate rock with an acid may be recovered as a fluorine-containing ammonium composition and subsequently treated to produce hydrogen fluoride.

In the manufacture of superphosphates by the reaction of phosphate rock with acids such as sulfuric acid, phosphoric acid and the like, gases are evolved which contain hydrogen fluoride, silicon tetrafluoride and other vapors. Similar fluorine-containing gases are obtained during the concentration of phosphoric acid which has been produced by the reaction of phosphate rock with sulfuric acid.

Numerous processes have been developed to recover the fluorine compounds from these gases in a form which will have accepted utility in commerce. These processes usually include steps in which the gases are absorbed in an aqueous medium and reacted with calcium, sodium or potassium compounds to produce the silicofluorides of calcium, sodium or potassium respectively.

Processes have been described by Gunter H. Gloss and John H. Gross in U. S. patent applications Serial Nos. 398,866 and 398,867, filed December 17, 1953, which issued February 5, 1957, as U. S. Patents 2,780,522 and 2,780,524, respectively, in which fluorine-containing ammonium compositions may be recovered by processing the above-identified fluorine-containing gases. Fluorine-containing ammonium compositions such as ammonium bifluoride which may be produced by these processes can be used in some instances as a reagent or raw material in place of hydrofluoric acid. However, ammonium bifluoride cannot be readily used as a substitute for hydrofluoric acid in certain fluorination processes, such as the production of aliphatic chlorofluorohydrocarbons, or the manufacture of aluminum fluoride.

When hydrogen fluoride is used as a raw material in a process it is desirable in many instances to be able to produce all of the hydrogen fluoride requirements at the site of the process. The hydrogen fluoride generator should preferably be relatively inexpensive and simple to operate.

It is an object of the present invention to provide a method for the production of hydrogen fluoride from a fluorine-containing ammonium composition.

It is a further object of this invention to provide a method of producing hydrogen fluoride from a fluorine-containing ammonium composition which has been obtained by reacting an aqueous ammonia solution with a gas containing fluorine compounds.

It is another object of this invention to provide a method of recovering ammonium sulfate in a process in which hydrogen fluoride is produced from a fluorine-containing ammonium composition.

It is another object of this invention to provide a simple method of producing hydrogen fluoride from a fluorine-containing ammonium composition, said method being relatively free of operating problems, recycle streams and complex equipment.

These and other objects of the invention will become apparent from the description as hereinafter provided.

Briefly, the invention comprises a novel method of producing hydrogen fluoride by heating a mixture of ammonium bisulfate and a fluorine-containing ammonium composition selected from the group consisting of ammonium bifluoride and ammonium bifluoride containing minor amounts of ammonium fluoride. The reactants are mixed in an amount equivalent to between about 0.9 mole and about 1.1 moles of ammonium bisulfate per mole of ammonia in the fluorine-containing ammonium composition. The reaction is carried out in a suitable reactor at a temperature in the range between about 200° and about 300° C. to evolve gaseous hydrogen fluoride. Ammonium sulfate is also a product of the reaction.

More in detail, a fluorine-containing ammonium composition selected from the group consisting of ammonium bifluoride and ammonium bifluoride containing minor amounts of ammonium fluoride may be produced either from den gases obtained in the reaction between phosphate rock and an acid such as sulfuric acid or from stack gases produced in the evaporation of wet process phosphoric acid. The fluorine-containing den gases or stack gases, as the case may be, are contacted with an aqueous ammoniacal solution to absorb the fluorine compounds from the gas and to cause part of the silicon present in the gases to precipitate as solid silica. Ammoniation of the slurry to a pH of about 8.5 causes all of the remaining silica to precipitate. The solid silica may be separated by filtration or the like with the resultant aqueous solution containing ammonium fluoride.

The den gases or stack gases also contain minor amounts of phosphatic compounds. When the gases are contacted with an aqueous ammoniacal solution as described above, the phosphatic compounds form soluble ammonium phosphates, which may be recovered in solid form mixed with the ammonium sulfate product. If the ammonium sulfate product is used as a fertilizer, the presence of the ammonium phosphates remaining with the ammonium sulfate serves to enhance its value for fertilizer purposes. On the other hand, in instances where the ammonium sulfate is to be desirably free of phosphatic impurities, then the purification steps used to eliminate phosphatic impurities from den gases or resulting solutions, as described in aforementioned U. S. patent applications Serial Nos. 398,866 and 398,867, may be employed.

After separation of the silica (and separation of phosphatic compounds if desired), the solution may be evaporated to form a molten mass which may be subsequently chilled to form solid ammonium bifluoride. It has been found that when the solution is evaporated to form a molten mass having an $NH_3/F$ mole ratio equivalent to ammonium bifluoride, a significant amount of fluorine is evolved with the gaseous ammonia and water vapor. Therefore, it is preferred to heat the molten mass to the point where the weight ratio of ammonium bifluoride to ammonium fluoride is between about 60 to 40 and about 90 to 10, preferably about 85 to 15, in order to minimize the amount of free fluorine evolved and to permit recovery of a substantially dry solid. The mixture is in molten form when the temperature is maintained between about 100° C. and about 135° C. The molten mass may be discharged on a water cooled drum flaker to produce a flake material containing not more than about 4% water. The molten mass may be cooled by other conventional means such as by discharging on a cooled stainless steel moving belt, or by prilling using the shot tower technique.

The term "fluorine-containing ammonium composition" used throughout the specification and claims refers to compositions selected from the group consisting of ammonium bifluoride and ammonium bifluoride containing minor amounts of ammonium fluoride. Ammonium bifluoride is preferably prepared as described above, but may be produced by other methods. The composition of ammonium bifluoride containing minor amounts of ammonium fluoride is also preferably prepared as described above but may be produced by other methods. In the latter composition, the ammonium fluoride is present in an amount less than about 40% by weight.

A fluorine-containing ammonium composition selected from the group consisting of ammonium bifluoride and ammonium bifluoride containing minor amounts of ammonium fluoride, is intimately mixed with ammonium bisulfate and heated in a suitable reactor, and depending upon the fluoride composition used to cause the first or both of the following reactions to occur:

(1) $NH_4HF_2 + NH_4HSO_4 \rightarrow (NH_4)_2SO_4 + 2HF$ (2) $NH_4F + NH_4HSO_4 \rightarrow (NH_4)_2SO_4 + HF$ Ammonium phosphate, if present in the fluorine-containing ammonium composition, is not believed to enter into the reaction to any significant degree.

The reactants may be mixed and added to the reactor in various physical forms. A fluorine-containing ammonium composition, which is in solid form, may be mixed with ammonium bisulfate in solid form and the mixture is added to the reactor. The resulting mixture may also be stored until ready for use or shipped to hydrogen fluoride reactors located at distant points. This modification will minimize storing and mixing problems at the reactor site, since there is no need for the elaborate proportioning equipment required to control the feeding of the reactants. Another modification is to mix the molten mass from the evaporation step described above with ammonium bisulfate and to then add this mixture to the reactor.

In the reaction of ammonium bisulfate with a fluorine-containing ammonium composition, it is possible to recover about 85% or more of the fluoride as hydrogen fluoride when stoichiometric quantities of reactants are used, i. e., about 1 mole of ammonium bisulfate per mole of ammonia in the fluorine-containing ammonium composition. The term "per mole of ammonia in the fluorine-containing ammonium composition" refers to the moles of total ammonia in the composition, i. e., ammonia present as ammonium ions in the ammonium compounds present in the composition either in the form of $NH_4F$, $NH_4F \cdot HF$ or in both forms. When the mole ratio of reactants is less than about 0.9 mole of ammonium bisulfate per mole of ammonia in the fluorine-containing ammonium composition, the recovery of fluoride as hydrogen fluoride is markedly decreased. While decomposition of the fluorine-containing ammonium composition can be obtained when the mole ratio of the reactants is greater than about 1.1:1, i. e., a molar excess of ammonium bisulfate greater than about 10% of the stoichiometric amount, the use of such an amount of ammonium bisulfate does not result in any appreciable increase in the recovery of hydrogen fluoride. In addition, ammonium bisulfate in excess of this amount reduces the capacity of the reactor without any compensatory improvements in the operation of the novel process. Therefore, from a practical standpoint, it is preferred to carry out the invention with reactants in an amount equivalent to between about 0.9 and about 1.1 moles of ammonium bisulfate per mole of ammonia in the fluorine-containing ammonium composition.

It will be recognized that chemical equivalents of ammonium bisulfate will give satisfactory results. For example, a mixture of ammonium sulfate and sulfuric acid having an $NH_3/SO_4$ mole ratio equivalent to ammonium bisulfate may be used in place of ammonium bisulfate.

After the reactants have been mixed, they are placed in a reactor having a suitable heat source and suitable means for recovering the hydrogen fluoride and ammonium sulfate products. The reaction may be carried out either batchwise or continuously.

A suitable reactor for carrying out the process batchwise may be comprised of a stainless steel tank, having a means for introducing the reactants, means for heating the reactants, means for recovering the hydrogen fluoride, and means for removing the solid or molten ammonium sulfate as the case may be.

Two factors which affect the degree of conversion to hydrogen fluoride are the temperature of the reactants and the time of reaction. The temperature of the reactants should be maintained at between about 200° C. and about 300° C., but preferably between about 220° C. and about 270° C. A characteristic of the reaction is that if the reactants are at room temperature when fed to the reactor, they become molten when heated to a temperature of about 130° C., and remain in a molten state until a temperature of about 180° C. is reached. At this temperature the molten mass becomes solid and the major portion of the fluorides are converted to hydrogen fluoride. When the temperature of the reactants is increased to greater than about 200° C., preferably between about 220° C. and about 270° C., it is possible to convert about 85% or more of the fluorine originally present in the feed into hydrogen fluoride. It is preferred that the reactants be heated as rapidly as possible to a temperature between about 200° C. and about 300° C. The time of reaction may be varied between about 15 minutes and one hour when the temperature of the reactants is maintained between about 200° C. and about 300° C., the shortest time being used with the highest temperature.

The hydrogen fluoride gas recovered from the reactor is contaminated with $SO_2$, $SO_3$, $NH_3$ and $H_2O$ impurities. These impurities may be removed by passing the gas through one or more scrubbers countercurrent to a concentrated aqueous sulfuric acid solution. The purified hydrogen fluoride gas may be used directly for various fluorination reactants at the reactor site, thus eliminating the necessity of shipping HF under pressure in cylinders or the hydrogen fluoride gas may be absorbed in water to produce solutions of hydrofluoric acid of various desired commercially useful concentrations.

The solid ammonium sulfate product is allowed to cool and may be bagged for sale as a fertilizer ingredient. As an alternate, the ammonium sulfate may be heated to volatilize about one mole of ammonia per mole of sulfate to produce ammonium bisulfate. The ammonia may be collected and recycled for use in the ammoniation of components of the den gases. The ammonium bisulfate may be recycled to the hydrogen fluoride reactor.

Another alternative use of the ammonium sulfate product involves mixing part of the ammonium sulfate product with sufficient sulfuric acid to give a mixture having an $NH_3/SO_4$ mole ratio of about one. This mixture is the chemical equivalent of an ammonium bisulfate material and may be recycled to the reactor. Spent sulfuric acid from the previously mentioned hydrogen fluoride gas scrubbers may be used for this purpose.

As illustrative of the character of the instant invention, but in nowise intending to be limited thereby, the following examples are described. All parts and percentages are by weight unless otherwise indicated.

*Example I*

Den gases produced by reacting sulfuric acid with phosphate rock were absorbed in an aqueous ammoniacal solution. This solution was further ammoniated to a pH of about 8.5 to precipitate silica. After separation of the silica by filtration, the solution was evaporated to a molten mass and solidified on a water cooled flaking drum dryer. Chemical analysis of the solid product was as follows:

| Component: | Percent by weight |
|---|---|
| $NH_4$ | 33.0 |
| F | 62.6 |
| $P_2O_5$ | 0.2 |
| $Fe_2O_3$ | 0.02 |

Portions A, B, and C were collected from the solid dryer product. Portion A was mixed with solid ammonium bisulfate in an amount equivalent to about 125 parts of portion A per 252 parts of ammonium bisulfate. The mixture was placed in a stainless steel reactor which was heated by electrical elements surrounding the outside of the reactor. The reactor was heated to a temperature of about 200° C. in about 1½ hours. The temperature was increased to about 260° C. in the following 25 minutes and then allowed to cool for about 25 minutes. At this time, the temperature of the reactor had decreased to about 220° C. During the reaction, the gases were recovered from the reactor and passed through three water scrubbers in series. The combined scrubber solutions contained about 69.2 parts of fluorine and about 10.6 parts of $NH_3$ per 125 parts of portion A in the feed. In this example, about 88.2% of the fluorine originally present in the feed was recovered in the scrubber liquor as a solution of hydrofluoric acid.

Example II

Portion B from Example I was mixed with solid ammonium sulfate and placed in the reactor used in Example I. The reactants were mixed in amounts equivalent to about 125 parts of portion B to about 140 parts of ammonium sulfate. To this mixture was added about 104 parts of $H_2SO_4$ as an aqueous solution of 96% $H_2SO_4$. The reactants were heated to a temperature of about 230° C. in about an hour, and this temperature was maintained for about 15 minutes. The combined scrubber solutions contained about 67.7 parts of fluorine and about 0.8 part of $NH_3$ per 125 parts of portion B in the feed. The ammonium sulfate product which was removed from the reactor contained about 72.3 parts of $NH_3$, about 192 parts of $SO_4$, and about 14.8 parts of fluorine per 125 parts of portion B in the feed. In this example, about 86.5% of the fluorine originally present in the feed was recovered in the scrubber liquor as a solution of hydrofluoric acid.

Example III

Portion C from Example I was mixed with ammonium sulfate and placed in the reactor used in Example I. The reactants were mixed in amounts equivalent to about 125 parts of portion C to about 140 parts of ammonium sulfate. To this mixture was added about 104 parts of $H_2SO_4$ as an aqueous solution of 96% $H_2SO_4$. The reactants were heated to a temperature of about 230° C. in about an hour, and this temperature was maintained for about 30 minutes. The combined scrubber solutions contained about 71 parts of fluorine and about 0.7 part of $NH_3$ per 125 parts of portion C in the feed. The ammonium sulfate product which was removed from the reactor contained about 74 parts of $NH_3$, about 186 parts of $SO_4$, and about 13.2 parts of fluorine per 125 parts of portion C in the feed. In this example, about 91% of the fluorine originally present in the feed was recovered in the scrubber liquor as a solution of hydrofluoric acid.

Having thus fully described and illustrated the invention, what is desired to be secured by Letters Patent is:

1. A method of producing hydrogen fluoride which comprises mixing ammonium bisulfate with a fluorine-containing ammonium composition selected from the group consisting of ammonium bifluoride and ammonium bifluoride containing a minor amount of ammonium fluoride, in an amount equivalent to at least about 0.9 mole of ammonium bisulfate per mole of ammonia in the fluorine-containing ammonium composition, and maintaining the reactants at a temperature between about 200° C. and about 300° C. to evolve hydrogen fluoride from the reaction mixture.

2. A method of producing hydrogen fluoride which comprises mixing ammonium bisulfate with a fluorine-containing ammonium composition selected from the group consisting of ammonium bifluoride and ammonium bifluoride containing a minor amount of ammonium fluoride, in an amount equivalent to between about 0.9 mole and about 1.1 moles of ammonium bisulfate per mole of ammonia in the fluorine-containing ammonium composition, and maintaining the reactants at a temperature between about 200° C. and about 300° C. to evolve hydrogen fluoride from the reaction mixture.

3. The method of claim 2, where the temperature of the reactants is maintained between about 220° C. and about 270° C.

4. The method of claim 2 in which the reacting mixture is maintained at the elevated temperature for a period between about 15 minutes and about 60 minutes.

5. A method of producing hydrogen fluoride which comprises mixing ammonium bisulfate with ammonium bifluoride in an amount equivalent to between about 0.9 mole and about 1.1 moles of ammonium bisulfate per mole of ammonia in the ammonium bifluoride, and maintaining the reactants at a temperature between about 200° C. and about 300° C. for a period between about 15 minutes and about 60 minutes to evolve hydrogen fluoride from the reaction mixture.

6. A method of producing hydrogen fluoride which comprises mixing ammonium bisulfate with an ammonium bifluoride composition containing a minor amount of ammonium fluoride in an amount equivalent to between about 0.9 mole and about 1.1 moles of ammonium bisulfate per mole of ammonia in the said ammonium bifluoride composition, maintaining the reactants at a temperature between about 200° C. and about 300° C. for a period between about 15 minutes and about 60 minutes to evolve hydrogen fluoride from the reaction mixture.

7. The method of claim 6 where the minor amount of ammonium fluoride contained in the ammonium bifluoride is less than about 40% by weight.

8. The method of claim 6 where the weight ratio of ammonium bifluoride to ammonium fluoride is between about 60 to 40 and about 90 to 10.

9. The method of claim 6 where the weight ratio of ammonium bifluoride to ammonium fluoride is about 85 to 15.

10. A method of producing hydrogen fluoride which comprises absorbing a silicon tetrafluoride-containing gas in an aqueous ammoniacal solution, adjusting the pH of the resulting solution to about 8.5 by ammoniation, whereby silica is precipitated, separating the precipitated silica from the resulting aqueous solution of ammonium fluoride, heating said solution to a temperature between about 100 and about 135° C. to volatilize ammonia and water and to form a molten mass containing ammonium bifluoride, mixing said molten mass with ammonium bisulfate in an amount equivalent to between about 0.9 and about 1.1 moles of ammonium bisulfate per mole of ammonia in said molten mass, maintaining the temperature of the resulting mixture between about 200° C. and about 300° C. for a period between about 15 minutes and about 60 minutes, whereby hydrogen fluoride is evolved therefrom, and recovering said hydrogen fluoride and the ammonium sulfate simultaneously produced.

11. The method of claim 10 wherein said silicon tetrafluoride-containing gas is produced by the reaction of phosphate rock with a mineral acid selected from the group consisting of sulfuric acid and phosphoric acid.

No references cited.